United States Patent Office 3,501,527
Patented Mar. 17, 1970

3,501,527
PROCESS FOR PREPARING ALKALINE EARTH SALTS OF HYDROXYARYLALKYL AMINES
Randel Q. Little, Jr., Munster, and Eli W. Blaha and Roger W. Watson, Highland, Ind., assignors to Standard Oil Company, Chicago, Ill., a corporation of Indiana
No Drawing. Filed Mar. 16, 1965, Ser. No. 440,288
Int. Cl. C07c 87/28; C10m 1/32
U.S. Cl. 260—570.9                 6 Claims

ABSTRACT OF THE DISCLOSURE

Oil-soluble neutral and basic alkaline earth metal salts of hydroxyarylalkyl amines are the direct products of reacting at one time either the four reactants (1) alkaline earth metal oxide, hydroxide or alcoholate, (2) alkyl and hydroxy substituted aromatic hydrocarbon, (3) aldehyde and (4) amine; or the three reactants (1) alkaline earth metal oxide, hydroxide or alcoholate, (2) alkyl and hydroxy substituted aromatic hydrocarbon and (3) aldehyde-ammonia or aldehyde-amine condensation product; or the three reactants (1) alkaline earth metal oxide, hydroxide or alcoholate, (2) alkyl, hydroxy and methylol substituted aromatic hydrocarbon and (3) amine. For example oil-soluble neutral calcium salt of N,N'-bis(nonyl and hydroxy substituted benzyl) ethylene diamine is the direct product of reacting at one time at a temperature of 190° to 200° F. the four reactants used in the proportions of (1) one mole of calcium hydroxide (2) two moles of nonylphenol, (3) two moles of formaldehyde and (4) one mole of ethylene diamine.

---

This invention relates to oil-soluble salts of coupled alkyl phenols and more specifically pertains to a method of preparing oil-soluble alkaline earth metal salts of coupled alkyl phenols.

Background of invention

Alkaline earth metal salts of coupled phenols such as hydroxyarylalkyl methanes and hydroxyarylalkyl amines are well known lubricant oil addition agents. Their preparation and use in lubricant oils is described for example in U.S. Patents 2,353,491; 2,363,134; 2,403,453; 2,424,-204; 2,431,011; 2,451,346; 2,459,114; 2,610,982; 2,984,-550; 2,957,908; and 3,036,003 among others. The alkaline earth metal salts of hydroxyarylalkyl amines have anti-oxidant properties, detergent dispersant properties and even alkaline or anti-acid properties.

Heretofore, the alkaline earth metal salts of coupled phenols amines have been prepared in two steps. First the hydroxyarylalkyl is coupled by a condensation reaction whereby an amine reactant such as ammonia, a mono primary amine and a polyamine, i.e., an amine having 2 or more primary amino groups (—NH$_2$) and/or secondary amino groups

is reacted with an alkyl substituted phenol and an aldehyde such as formaldehyde or acetaldehyde or by a condensation reaction between an alkyl substituted penol and an aldehyde-ammonia reaction product such as hexamethylene tetramine and similar aldehyde amine reaction products or by a condensation reaction between ammonia or the foregoing amines with an alkyl substituted hydroxy phenol methanol (an alkyl substituted methylolphenol) which is a phenolformaldehyde reaction product. Then the coupled phenol is reacted with an alkaline earth metal compound such as the oxide, hydroxide, or alcoholate to convert the phenolic hydroxy group to a metaloxy or alkoxy metaloxy group. The latter can be converted by hydrolysis to a hydroxy metaloxy group (HO—M—O) where M is the alkaline earth metal.

The aforementioned coupling or condensation reactions between the aldehyde, amine and alkyl phenol or their equivalents is conducted at conveniently elevated temperatures, e.g. 200 to 500° F. When the amine reactant, aldehyde and alkyl phenol or amine reactant and alkyl methylolphenol are reacted and water forms as a by-product, the reaction is carried out under conditions which enhance removal of by-product water. Also conditions to enhance removal of by-product water are employed in the neutralization of the phenolic hydroxy groups. Such water removal enhancing conditions include operation above the ambient boiling point of water and/or injecting a gas such as nitrogen or carbon dioxide.

However, before neutralizing the phenolic hydroxy group in the second step it is necessary to cool the first step reaction mixture below about 200° F. to assure presence of water so that reaction will occur with certain of the alkaline earth metal compounds. After neutralization the final product is cooled. Thus two heating and two cooling cycles are employed.

Also according to the prior techniques the first step and/or the second step is carried out in the presence of volatile or non-volatile solvents or mixtures of the two types of solvents. The first step is carried out to produce the coupled phenol product which has two or more alkyl substituted phenol moieties. This product should be water-insoluble but the first step reaction should not be conducted under conditions of temperature or ratios of reactants which produce an oil-insoluble product. The conditions of temperature and ratio of reactants necessary to produce a water-insoluble but oil-soluble first step reaction product are well known to those skilled in this art.

Summary of invention

It has now been discovered that the oil soluble alkaline earth metal salts of coupled alkyl phenols can be prepared in a one step reaction involving heating and cooling only one time. The single step method of preparation according to the present invention comprises combining the alkaline earth metal compound with the other reactants, i.e., with the aldehyde, amine reactant and alkyl phenol, or with the amine and alkyl substituted methylolphenol or with the alkyl substituted phenol and an aldehyde-ammonia or aldehyde-amine reaction product in the presence or absence of a reaction diluent, heating the mixture to a temperature in the range of 200 to 500° F. and maintaining that temperature until by-product water has been removed and then cooling the reaction mixture. As with the prior methods, a reaction diluent such as a volatile or a non-volatile type or mixture of the two can be used. Since the final salt product is to be used as a lubricating oil addition agent a light mineral oil is advantageously used as reaction diluent. Light mineral oils such as light lubricant blending oils, e.g. solvent extracted SAE-5W oil or pale oil (a paraffinic base refined hydrocarbon oil having 96–104 S.S.U. viscosity at 100° F.), white mineral oil and the like are useful diluents.

The process of this invention can be employed to prepare the "exactly neutralized" alkaline earth metal salts, that is where there is present one gram atom of alkaline earth metal for each two gram moles of hydroxy group (2OH). The process of this invention can be employed to prepare "basic" alkaline earth metal salts, that is where there is present one gram atom of alkaline earth metal for each hydroxy group such as are present where alkoxymetal and hydroxymetal replace the hydrogen of the phenolic hydroxy group. The exactly neutralized salts are obtained by the use of one gram mole of the alkaline earth metal compound reactant such as the oxide, hydroxide or alcoholate for each two moles of alkyl phenol or alkyl methylolphenol. The hydroxymetal basic salts are obtained by reacting one mole alkaline earth metal alcoholate desirably of a lower alcohol and preferably a methylate or ethylate for each mole of alkyl phenol or alkyl methylolphenol under conditions where water is not a by-product of the reaction producing the coupled alkyl phenolate, as when the coupling is accomplished by tetramethylene tetramine for example. The alkoxymetal basic salts are obtained through hydrolysis of the alkoxymetal salts, e.g. the hydoxymagnesium salt can be obtained by hydrolysis of the methoxymagnesium salt with water in the presence of toluene as reaction diluent at reflux conditions and then distilling off water, methanol and toluene.

For the purposes of this invention the alkyl phenol reactant can be a mono-, di- and tri-alkylphenol having at least one alkyl group of 5 to 70 carbon atoms. Preferably, the alkyl phenols are alkyl hydrocarbon substituted mono phenols such as phenol, cresols, xylenols, mesitol, thymol and higher alkyl hydrocarbon homolog substituted hydroxybenzenes such as ethyl phenol (phlorol), propyl phenol, diethyl phenol, dipropyl phenol, n-butyl phenol, tertiary-butyl phenol and di(tertiary-butyl) phenol which also have a $C_5$ to $C_{70}$ alkyl hydrocarbon substituent. Such alkyl phenols having a $C_5$ to $C_{70}$ alkyl hydrocarbon substituent are conveniently obtained as commercial products such as the octyl and nonyl phenols which can be mixtures of mono- and di-octyl, mono- and di-tert. octyl, mono- and di-nonyl substituted phenols and cresols. Also the $C_5$ to $C_{70}$ alkyl hydrocarbon substituted phenols can be conveniently prepared by known techniques for alkylating for example, in the presence of a Friedel-Crafts catalyst such as $BF_3$ phenols, cresols, xylenols, etc. with propylene dimer, propylene tetramer, propylene pentamer, isobutylene dimer, isobutylene trimer, isobutylene tetramer, isobutylene pentamer and liquid viscous hydrocarbon polymers of propylene or isobutylene or copolymers of mono olefins such as copolymers of propylene with ethylene, butylenes, amylenes or copolymers of isobutylene with ethylene and amylenes which liquid viscous hydrocarbon polymers and copolymers have an average molecular weight preferably in the range of from about 200 to about 1000 (about $C_{14}$ to about $C_{70}$). The most preferred alkll phenol reactants are the monoalkyl hydrocarbon substituted mono-phenols (monohydroxy benzenes) having as the one alkyl substituent a $C_5$ to $C_{70}$ alkyl hydrocarbon substituents.

The alkyl methylolphenol reactants which are useful for the purposes of this invention are the methylol, preferably the monomethylol, derivatives of the foregoing alkyl hydrocarbon monophenols having at least one $C_5$ to $C_{70}$ alkyl hydrocarbon substituent. Such alkyl substituted methylolphenols are the substantial equivalent of the product obtained by reacting a member of the foregoing class of alkyl phenols having at least one $C_5$ to $C_{70}$ alkyl hydrocarbon substitutent with formaldehyde or its equivalent (paraformaldehyde, trioxymethylene and formalin) in equimolecular portions.

The amine reactant for the purpose of this invention can be ammonia or its reaction product with an aldehyde such as hexamethylene tetramine or aldehyde ammonia, primary mono-amines and polyamines. Preferably, the primary mono-amine member of the amine reactants is an aliphatic primary mono-amine including methylamine, ethylamine, n-propylamine, isopropylamine, n-butylamine, tert.-butylamine, hexylamine, octylamine and higher homologs thereof. The polyamine members of the amine reactant include alkylene diamines having two primary amino groups one primary and one secondary amino groups or two secondary amino groups. Prefered alkylene diamines are those which have other than the amine nitrogens only hydrogen and carbon atoms with the hydrocarbon substituents in the secondary amino groups consisting of alkyl hydrocarbon groups. Such alkylene diamines include but are not limited to the types illustrated by ethylene diamine, N-methylethylene diamine, N,N-dimethylethylene diamine, N-ethyl, N'-methylethylene diamine, 1,3-diaminopropene, 1,2-diaminopropene, 1,4-diaminobutane, 1,3-diaminobutane, pentamethylene diamine, hexamethylene diamine, and higher homologs thereof. The polyamine member of the amine reactant includes the following illustrative specific compounds as diethylene triamine, triethylene tetramine, tetraethylene pentamine, heptaethylene octamine, dipropylene triamine, tripropylene tetramine, tetrapropylene pentamine, and the like which are produced by the reaction of an alkyl dihalide with ammonia and are generally known as alkylene polyamines. Derivatives of such alkylene polyamines which have one lower alkyl hydrocarbon substituent or one or more up to all of the internal or chain secondary nitrogens and even one or both of the terminal primary nitrogens are also useful as amine reactants.

The aldehyde reactant can be formaldehyde or one of its equivalents such as paraformaldehyde, trioxymethylene, formacel (alcoholic solution of formaldehyde) or formalin. The aldehyde reactant can also be acetaldehyde, butyraldehyde, furfuraldehyde, benzaldehyde and toluic aldehyde. However, preference is given to the aliphatic aldehydes with formaldehyde being particularly preferred.

No novelty is claimed in the discovery of the particular members of reactants and their proportions essential to the formation of alkaline earth metal salts of the coupled phenols for such novelty with respect to reactants and their proportions especially to produce oil-soluble salts is part of the knowledge of those skilled in the art. However, novelty is asserted for the one reaction step method of preparation hereinbefore defined. The one reaction step method of this invention can be illustrated by the following examples from which will be a guide to those skilled in this art for the preparation of many other different but related oil-soluble salts.

EXAMPLE 1

To a stainless steel reaction kettle, equipped with a mixer and reflux condenser, the following raw materials are added and the temperature is maintained below 150° F. :

100 gallons solvent extracted SAE-5W base oil.
1637 pounds (7.3 pound-moles) nonylphenol containing one pint antifoam solution.
275 pounds (3.72 pound-moles) calcium hydroxide slurried in 130 gallons solvent extracted SAE-5W base oil.
224 pounds (3.65 pound-moles) ethylene diamine.
595 pounds (7.3 pound-moles) formalin containing 37% formaldehyde.

also a total of 20 gallons of water and 20 gallons of solvent extracted SAE-5W base oil are added as line washes in between the ingredient charges. The reaction mixture is heated to 190° F. and maintained between 190-200° F. for one hour to effect reaction. The condenser is then adjusted to distill and the reaction mixture is heated to 300° F. to remove volatile solvents. Final drying is accomplished by purging with nitrogen gas for one hour. Fifty pounds of coarse filtercel is added to the reaction mixture and it is filtered through a Sparkler filter, precoated with 25 pounds of coarse filtercel. The product is diluted with an additional 143 gallons of solvent extracted SAE-5W base oil during the filtration step. The product produced is a 42T concentrate in solvent extracted SAE-5W base oil and the yield nearly theoretical, for the exactly neutralized calcium salt of N,N'bis(nonyl hydroxybenzyl) ethylene diamine. Analyses for the product are given and compared with a typical analysis for a 42% concentrate of exactly neutralized calcium salt of N,N'-bis(nonyl hydroxybenzyl) ethylene diamine prepared by the prior two-step procedure:

|  | Calcium salt (one-step) | Calcium salt (two-step) |
| --- | --- | --- |
| Specific gravity, lbs./gal | 7.81 | 7.84 |
| Total base number | 152 | 149 |
| Percent Ca | 2.80 | 2.98 |
| Percent N | 2.02 | 2.02 |
| Ca/N | 1.39 | 1.48 |

The foregoing calcium salts are known antioxidants for lubricant oils. The equivalence of antioxidant effectiveness of product formed by the one-step procedure versus the two-step procedure is shown as follows: Oil blend: SAE-40 oil +1.1% by volume of a dispersant +5.2% by volume of the calcium salt (42% concentrate).

| Test | Calcium salt (one-step) | Calcium salt (two-step) |
| --- | --- | --- |
| Oxidation test:[1] | | |
| Percent viscosity increase, 100° F | 17 | 16 |
| Percent pentane insolubles | 0.04 | 0.04 |
| pH | 6.6 | 7.0 |
| Total base number | 0.6 | 0.8 |
| Modified SSCT,[2] mg. Cu-Pb corrosion: | | |
| 48 hrs | 100 | 20 |
| 74 hrs | 330 | 220 |
| ISOT, 72 hour ratings:[3] | | |
| Varnish (10=perfect) | 10 | 10 |
| Acidity, mg. KOH/g | 4 | 4 |
| Naphtha insolubles, percent | 0.1 | 0.3 |
| S.U. Viscosity: | | |
| 100° F | 1,700 | 1,800 |
| 210° F | 100 | 110 |

[1] Oxidation test conditions: 300 ml. oil—50 ml. samples replaced with new oil after 48 and 96 hrs., 5 liters $O_2$/hr., 285° F., 144 hrs., 6 sq. in. Cu-Pb bearing specimen.
[2] Modified SSCT conditions: 300 grams of oil stirred at 1,300 r.p.m., 330° F., 72 hrs., 50 grams sand and "Cu-Pb" bearing insert.
[3] ISOT conditions: 300 grams of oil stirred at 1,300 r.p.m., 330° F., 72 hrs., glass varnish rod, 5 sq. in. Cu and 10 sq. in. Fe catalysts.

EXAMPLE 2

There are combined at 140° F. in a smaller reaction vessel of the type employed in Example 1 the following ingredients:

5418 grams of pale oil,
3366 grams of alkyl phenol (12 moles) whose alkyl group is from a $C_{10}+$ fraction of liquid polypropylene,
280 grams of hexamethylene tetramine (2 moles), and
4110 grams of magnesium methoxy ethanolate containing 12 moles of magnesium.

Thereafter the resulting mixture is heated to 245–250° F. for about one hour to effect reaction. The condenser is adjusted to distill and the reaction mixture is heated to 345° F. and blown with nitrogen injection to remove volatile materials and blown with $CO_2$ for about one hour. This product is filtered as described in Example 1.

EXAMPLE 3

There is added to the reaction vessel used in Example 1 the following ingredients:

535 gallons solvent extracted SAE-5W base oil heated to 130° F.,
7.3 pound moles of alkyl phenol of 900 average molecular weight whose alkyl group is a $C_{57}$ polypropylene,
3.72 pound moles calcium hydroxide slurried in 110 gallons solvent extracted SAE-5W base oil,
3.65 pound moles ethylene diamine and
7.3 pound moles formaldehyde equivalent added as paraformaldehyde.

The resulting mixture is heated to and maintained at 200–210° F. for one hour. Thereafter volatile materials were distilled therefrom at 325–335° F. and then dried with nitrogen injection. The dried product is filtered as described in Example 1, and diluted with 320 gallons SAE-5W oil. A product so prepared contains about 49% by weight of the exactly neutralized calcium salt of N,N'-bis($C_{57}$ alkyl hydroxybenzyl)ethylene diamine.

EXAMPLE 4

A mixture of 1030 grams (5.0 moles) p-tert. octylphenol, 150 grams (2.5 moles) ethylene diamine, 406 grams formaldehyde solution (formalin 37% formaldehyde used, 1040 grams solvent extracted SAE-10 base oil diluted with toluene, a slurry of 2.5 moles (190 grams) calcium hydroxide in 1040 grams solvent extracted SAE-10 base oil is prepared. This mixture is heated at 190–200° F. for about one hour and thereafter the water and toluene are removed by distillation. Final drying is conducted at 280° F. with the aid of nitrogen injection. By this method a 39% by weight solution of exactly neutralized calcium salt of N,N'-bis(p-tert. octyl hydroxybenzyl) ethylene diamine in SAE 10 oil may be produced.

EXAMPLE 5

A portion of the methoxymagnesium salt product of Example 2 containing 0.5 mole of the dimethoxy magnesium salt is heated with 18 grams (1.0 mole) water under reflux conditions. The resulting product is dried at 230° F. with the aid of nitrogen injection. In this manner the dihydroxy magnesium salt may be prepared.

EXAMPLE 6

In a reaction vessel of the type described in Example 1 there is combined 328 grams (2.0 moles) p-amyl phenol, 189.4 grams (1.0 mole) tetraethylene pentamine, 650 grams of solvent extracted SAE-5W base oil, formalin (37% formaldehyde) to provide 2.0 moles formaldehyde and one mole calcium hydroxide slurried in 100 grams solvent extracted SAE-5W base oil. This mixture is heated to and maintained at 190–210° F. for one hour. Thereafter the mixture is heated to 330° F. and nitrogen is injected to facilitate drying. In this manner a 44 weight percent solution of calcium salt of N,N-bis(p-amylhydroxy benzyl) tetraethylene pentamine may be prepared.

EXAMPLE 7

The process of Example 6 is repeated except that a slurry of one mole barium oxide in 100 grams solvent extracted SAE-5W oil is used in place of the oil slurry of calcium hydroxide. In this manner the barium salt of N,N-bis(p-amylhydroxy benzyl) tetraethylene pentamine dissolved in solvent extracted SAE-5W base oil may be prepared.

From the foregoing illustrative examples those skilled in this art of preparing alkaline earth metal exactly neutralized and basic salts of coupled phenols can prepare other members of such alkaline earth metal salts employing other alkyl substituted phenols and the necessary coupling agent to obtain the alkaline earth metal coupled phenolates.

What is claimed is:

1. In the method of preparing alkaline earth metal salts of coupled alkyl phenols from an alkaline earth metal compound selected from the class consisting of oxide, hydroxide and lower alcoholate of alkaline earth metal and reactants (A) selected from the class consisting of alkyl substituted hydroxyl aromatic reactant selected from the class consisting of hydroxy and hydroxy methylol substituted aromatic hydrocarbons, (B) an aldehyde and (C) an amine reactant, wherein said alkyl substituent of the alkyl substituted hydroxy aromatic reactant (A) is an alkyl hydrocarbon having 5 to 70 carbon atoms and there is employed for each mole of said alkyl-substituted hydroxy aromatic reactant 0.5 to 1.0 mole of said alkaline earth metal compound; the improvement of heating to a temperature in the range of 150 to 300° F. in said ratio a mixture of said alkaline earth metal compound and reactants selected from the class consisting of said alkyl substituted hydroxy aromatic reactant (A), an aldehyde (B), and amine reactant (C).

2. The method of claim 1 wherein the heating of the mixture of reactants is carried out in the presence of a light oil diluent.

3. The method of claim 1 wherein there is heated a mixture of reactants consisting of calcium hydroxide, mono- $C_5$ to $C_{70}$ alkyl hydrocarbon substituted monophenol, formaldehyde and ethylene diamine present in the mole ratio of one mole of calcium hydroxide, two moles of said alkyl-substituted phenol and two moles of formaldehyde for each mole of ethylene diamine in the presence of solvent extracted SAE-5W base oil.

4. The method of claim 3 wherein said alkyl hydrocarbon substituted phenol is nonyl phenol.

5. The method of claim 3 wherein said alkyl hydrocarbon substitutetd phenol has its alkyl substituent derived from a mono-olefin polymer of 250 to 1000 average molecular weight.

6. The method of claim 1 wherein there is heated a mixture consisting of calcium hydroxide, mono- $C_5$ to $C_{70}$ alkyl mono-phenol, formaldehyde, and tetraethylene pentamine in the mole ratio of one mole calcium hydroxide, two moles said alkyl-substituted phenol and two moles of formaldehyde for each mole tetraethylene pentamine in the presence of solvent extracted SAE-5W base oil.

References Cited

UNITED STATES PATENTS

| | | | |
|---|---|---|---|
| 2,363,134 | 11/1944 | McCleary | 260—570.9 |
| 2,725,357 | 11/1955 | Kluge et al. | 260—570.9 |
| 2,725,358 | 11/1955 | Kluge et al. | 260—570.9 |
| 3,036,003 | 5/1962 | Verdol | 252—33.4 |

FLOYD D. HIGEL, Primary Examiner

U.S. Cl. X.R.

208—18; 252—51.5; 260—239